United States Patent [19]

Stackman et al.

[11] 4,064,107

[45] Dec. 20, 1977

[54] HIGH TEMPERATURE POLYUREA RESINS

[75] Inventors: Robert W. Stackman, Morristown; Anthony B. Conciatori, Chatham, both of N.J.

[73] Assignee: Celanese Corporation, New York, N.Y.

[21] Appl. No.: 713,723

[22] Filed: Aug. 12, 1976

[51] Int. Cl.$^2$ .............................................. C08G 71/02
[52] U.S. Cl. ......................... 260/47 CB; 260/775 CH
[58] Field of Search ................... 260/47 CB, 77.5 CH

[56] References Cited

U.S. PATENT DOCUMENTS

| 2,374,136 | 4/1945 | Rothrock | 260/22 |
| 3,345,334 | 10/1967 | Angelo | 260/47 |
| 3,654,364 | 4/1972 | Meckel et al. | 260/571 |

Primary Examiner—Lester L. Lee

[57] ABSTRACT

This invention provides high temperature performance polyurea resins which contain polyphenyl ether blocks as recurring structural units. The polyurea resins are melt stable at temperatures up to about 400° C and higher.

12 Claims, No Drawings

HIGH TEMPERATURE POLYUREA RESINS

BACKGROUND OF THE INVENTION

There has been continuing effort to develop new types of high performance polymeric compositions which exhibit high heat and oxidation resistance and improved mechanical properties.

U.S. Pat. No. 3,264,536 describes a novel type of solid thermoplastic polyarylene polyether which is adapted for incorporation in an electric capacitor as a dielectric. The preferred linear thermoplastic polyarylene polyethers are prepared in an essentially equimolar one-step reaction of a double alkali salt of a dihydric phenol with a dihalobenzenoid compound in the presence of specific liquid organic sulfoxide or sulfone solvents under substantially anhydrous conditions.

U.S. Pat. No. 3,332,909 discloses a type of organic polymers which have ether oxygen atoms valently connecting together aromatic nuclei or residue or aromatic compounds:

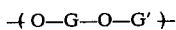

wherein G is the residuum of a dihydric phenol, and G' is the residuum of a dibromo or diiodobenzenoid compound.

U.S. Pat. No. 3,375,297 provides novel linear thermoplastic polymers which are polyhydroxyethers having the formula:

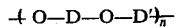

wherein D is the residuum of a dihydric phenol, D' is a hydroxyl containing residuum of an epoxide, and $n$ represents the degree of polymerization and is at least 30 and is preferably 80 or more.

U.S. Pat. No. 3,516,966 described a type of film and fiber forming copolyketone polymer consisting essentially of the recurring structural unit:

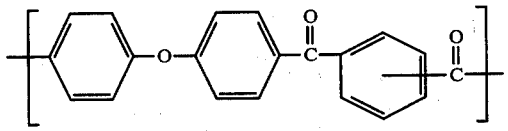

U.S. Pat. No. 3,809,682 provides an improved process for the manufacture of aromatic polyethers and polythioethers by treatment of the alkali salt of a divalent aromatic phenol or an aromatic dimercapto compound with an aromatic dihalogen compound in a polar solvent.

U.S. Pat. No. 3,678,006 discloses a new class of polyphenylene copolymers, tripolymers and quaterpolymers modified with an alkyl and/or aryl phenolic compound and/or aromatic amine curable to useful coating, bonding and molded resins with curing agents generally applicable to phenolic resins.

U.S. Pat. No. 3,886,120 and 3,886,121 describes a process for preparing polyarylenepolyether polymers of the formula:

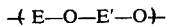

wherein E represents a residual divalent phenol group and E' represents a residual benzenoid group having a weak electron withdrawing group in at least one of the positions ortho or para to the valence bonds.

The high performance polymers known in the prior art generally undergo thermal changes at a molding temperature higher than 300° C. Polyaromatic polymers often become discolored under high temperature melt conditions, so that transparency is reduced and light-transmittance of the polymeric mass is lowered. Further, high performance polymers which exhibit high temperature stability are deficient with respect to other desirable properties such as flexibility and solubility in solvents.

Accordingly, it is an object of this invention to provide a novel class of high performance polymers which exhibit improved flexibility and transparency, and good melt stability.

It is another object of this invention to provide polyester resins which are thermally stable at temperature up to about 400° C, and which exhibit low flammability.

It is another object of this invention to provide polyurea resins which are amenable to powder coating techniques.

It is a further object of this invention to provide polyurea resins which contain polyphenyl ether blocks, and which can be melt extruded or molded at temperatures between about 350° C and 400° C, and which are solvent soluble.

Other objects and advantages of the invention shall become apparent from the following description and examples.

DESCRIPTION OF THE INVENTION

One or more objects of the present invention are accomplished by the provision of polyurea resin compositions which consist essentially of the recurring structural unit:

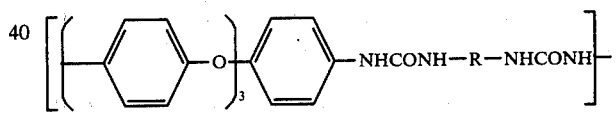

wherein R is selected from the group consisting of

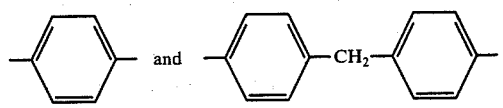

The preferred polyurea resin compositions of the present invention have an average molecular weight in the range between about 1,000 and 50,000. The polyester resin compositions nominally have an inherent viscosity between about 0.3 and 1.0. Inherent viscosity is calculated according to the formula:

$$I.V. = \frac{\text{natural log} \frac{\text{Viscosity of solution}}{\text{Viscosity of solvent}}}{C}$$

wherein C is the concentration expressed in grams per 100 milliters of solution.

The preferred polyurea resin compositions are characterized by a melting point range which is below about 350° C. This is an important feature for purposes of melt extrusion and molding applications.

Structurally the polyurea resin compositions correspond to the condensation polymerization reaction product of p,p'-bis(4-aminophenoxy)diphenyl ether and a selected polyisocyanate compound. The polyurea resin compositions are preferably prepared by the condensation polymerization reaction of p,p'-bis(4-aminophenoxy)diphenyl with tolylene diisocyanate or methylene di-p-phenylisocyanate.

The p,p'-bis(4aminophenoxy)diphenyl ether condensation reaction component can be synthesized in the following manner:

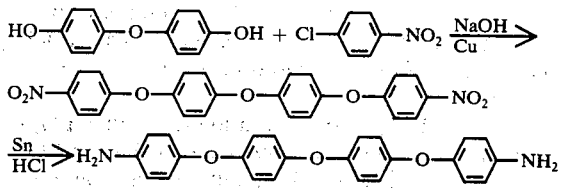

The polyurea resin compositions can be prepared by condensation polymerization of p,p'-bis(4-aminophenoxy)-diphenyl ether with tolylene diisocyanate and/or methylene di-p-phenylisocyanate on an approximately equimolar basis. If the equimolar proportions of reactants are varied more than about 5 percent, the molecular weight of the resultant polyurea resin product is reduced.

The condensation polymerization reaction preferably is conducted in a reaction medium such as methylene chloride. The polymerization reaction temperature can vary in the range between about 100° C and 250° C. The reflux temperature of the solvent medium is normally a suitable temperature for the polymerization reaction.

The polyurea product of the polymerization reaction is recovered in any convenient manner, such as by precipitation induced by cooling or by adding a nonsolvent for the polyurea product or by stripping the solvent at reduced pressures. Neutralization and removal of salts can be accomplished by appropriate aqueous wash procedures.

The present invention polyurea resin compositions have excellent melt stability and can be melt extruded at a temperature of 350° C with little evidence of decomposition. The polyurea resin compositions form clear fibers which have good flexibility and mechanical strength.

A particularly advantageous property of the polyester resin compositions is their solubility in conventional polymer solvents such as methylene chloride, tetrachloroethylene, 1,1,2,2-tetrachloroethane, dimethylsulfoxide, dimethylformamide, dimethylacetamide, and the like. Films and coatings are readily castable from a solution medium.

The polyurea resin compositions exhibit low flammability, and do not support combustion. Direct contact of a polyurea resin composition with flame produces a char.

The present invention polyurea resin compositions are also amenable to powder coating techniques. Metal objects can be coated rapidly and economically in a high capacity powder coating operation.

The following examples are further illustrative of the present invention. The reactants and other specific ingredients are presented as being typical and various modifications can be derived in view of the foregoing disclosure within the scope of the invention.

EXAMPLE I

Preparation Of p,p'-Bis (4-aminophenoxy)diphenyl Ether a. In a first procedure, a 500 ml flask equipped with a reflux condenser, stirrer and nitrogen inlet was charged with 40 grams (0.2 mole) oxydiphenol, 22.8 grams (0.56 mole) potassium hydroxide, 100 millimeters dimethyl sulfoxide and 0.1 gram copper powder. The mixture was heated to 150° C, and with stirring 94 grams (0.6 mole) of p-chloronitrobenzene were added slowly over a period of two hours. The mixture was heated for an additional three hours, then poured into water to precipitate a brown-yellow solid. The precipitate was washed with water and methanol, and then recrystallized from benzene. A white crystalline product (23 grams) was obtained which had a melting point of 150°–153.5° C.

b. In a second procedure, a 500 ml flask was charged with 18.6 grams of p,p'-bis(4-nitrophenoxy)diphenyl ether, 35 grams of tin, and 200 milliliters of concentrated hydrochloric acid. The mixture was stirred at 80° C for 24 hours, then neutralized with aqueous sodium hydroxide until strongly basic. A dark gray solid was obtained by filtration. The solid was extracted with hot acetone, and the acetone extract was poured into water to precipitate a white solid. The precipitate was recrystallized from aqueous acetone to yield 13 grams of p,p'-bis(4-aminophenoxy)-diphenyl ether, M.P 159°–162° C.

EXAMPLE II

Preparation Of A Polyurea Resin Containing Polyphenyl Ether Blocks

A 300 ml flask was charged with 100 milliliters of dimethylformamide, 3.8 grams of p,p'-bis(4-aminophenoxy)-diphenyl ether, and 1.74 grams of tolylene diisocyanate. The resulting solution was stirred for eight hours at room temperature, during which time the solution became viscous. The solution was poured into rapidly stirred water to precipitate a pale tan solid polymer. The polymer had an inherent viscosity (I.V.) of 0.52 dl/g (0.1% in DMF) and a melting point of 290°–303° C. TGA indicated a 5% decomposition weight loss in air at 360° C.

The polymer product could be melt extruded at temperatures below 340° C, and compression molded into film at 280° C and 15,000 psi.

A similar polymer prepared from 0.002 mole of methylene di-p-phenylisocyanate (MDI) with 0.002 mole of p,p'-bis(p-aminophenoxy)diphenyl ether had an inherent viscosity of 0.46 dl/g at 0.1% in dimethylformamide, a melting point of 300°–305° C, and a TGA decomposition weight loss of 5% in air at 357° C.

A similar polyurea prepared from 4,4'-diaminodiphenyl ether cannot be melt extruded below its decomposition point.

What is claimed is:

1. A polyurea resin which consists essentially of the condensation polymerization product of p,p'-bis(4-aminophenoxy)diphenyl ether with tolylene diisocyanate.

2. A polyurea resin in accordance with claim 1 which exhibits melt stability at temperatures in the range between about 350° C and 400° C.

3. A polyurea resin in accordance with claim 1 in the form of a shaped molded article.

4. A polyurea resin in accordance with claim 1 in the form of a fiber.

5. A polyurea resin in accordance with claim 1 in the form of a film.

6. A polyurea resin which consists essentially of the condensation polymerization product of p,p'-bis(4-aminophenoxy)diphenyl ether and methylene di-p-phenylisocyanate.

7. A polyurea resin in accordance with claim 6 which exhibits melt stability at temperatures in the range between about 350° C and 400° C.

8. A polyurea resin in accordance with claim 6 in the form of a shaped molded article.

9. A polyurea resin in accordance with claim 6 in the form of a fiber.

10. A polyurea resin in accordance with claim 6 in the form of a film.

11. An article coated with a polyester resin in accordance with claim 1.

12. An article coated with a polyester resin in accordance with claim 6.

* * * * *